No. 808,262. PATENTED DEC. 26, 1905.
DE WITT W. STRICKLAND.
FERTILIZER DISTRIBUTER AND SEED PLANTER.
APPLICATION FILED MAY 19, 1905.
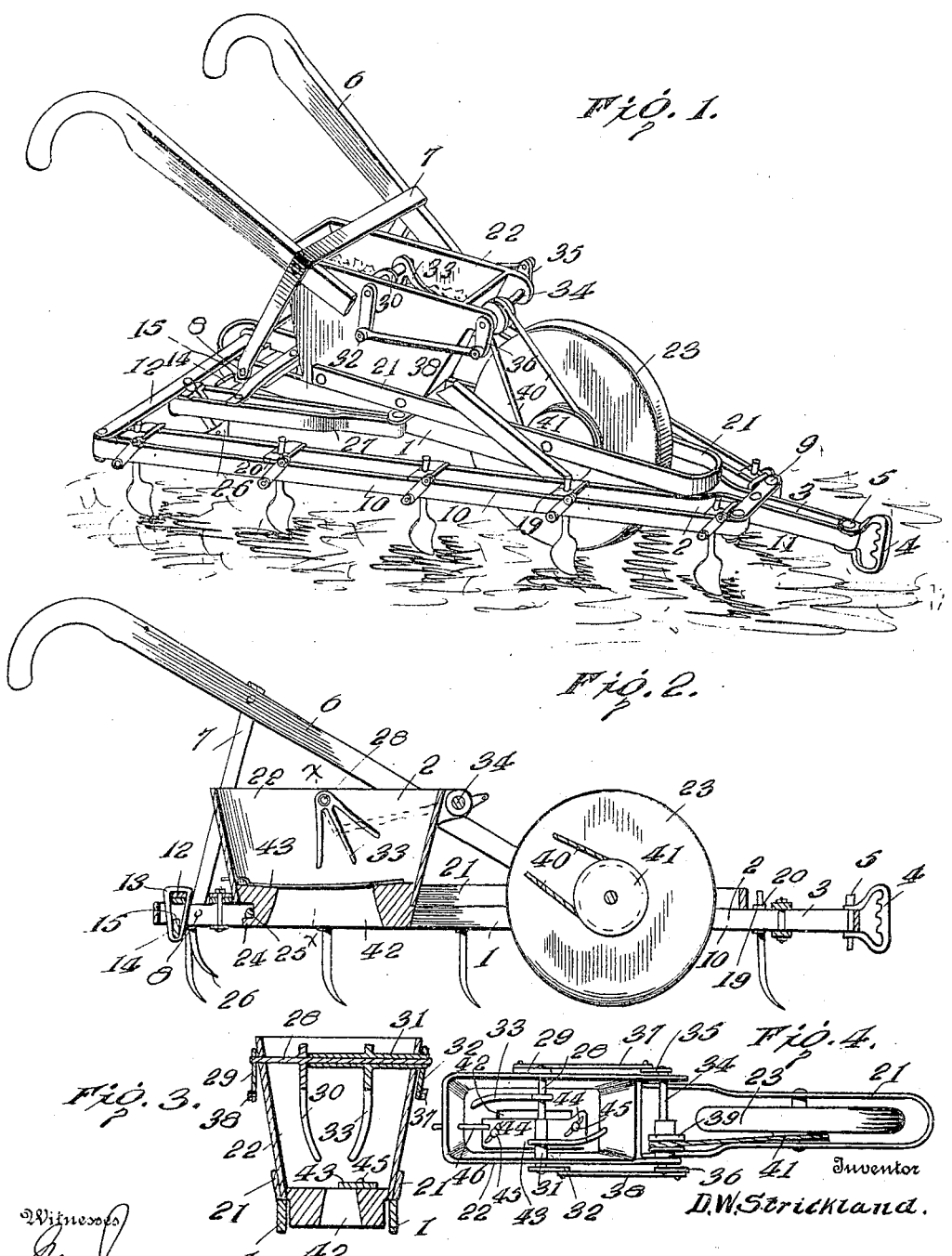

UNITED STATES PATENT OFFICE.

DE WITT W. STRICKLAND, OF MAGNOLIA, MISSISSIPPI.

FERTILIZER-DISTRIBUTER AND SEED-PLANTER.

No. 808,262.            Specification of Letters Patent.            Patented Dec. 26, 1905.

Application filed May 19, 1905. Serial No. 261,245.

*To all whom it may concern:*

Be it known that I, DE WITT W. STRICKLAND, a citizen of the United States, residing at Magnolia, in the county of Pike and State of Mississippi, have invented certain new and useful Improvements in Fertilizer-Distributers and Seed-Planters, of which the following is a specification.

In accordance with this invention an attachment is provided that may be applied to an implement, such as a cultivator or harrow, either for distributing fertilizer or depositing seed and which will operate as satisfactorily in either capacity as a machine specially constructed for the particular character of work.

The invention contemplates a beam, a frame detachably fitted thereto, distributing mechanism at one end of the frame, a ground-wheel at the opposite end of the frame freely movable therewith to a limited extent to conform to rolling ground and irregularities in the surface thereof, and novel actuating means for operating the distributing mechanism.

The invention further contemplates the novel structural features, details, and combinations of parts, which hereinafter will be more particularly set forth, illustrated, and finally claimed.

In the accompanying drawings, forming a part of the specification, Figure 1 is a perspective view of a cultivator having the attachment in position. Fig. 2 is a vertical central longitudinal section thereof. Fig. 3 is a tranverse section on the line *x x* of Fig. 2, the handle-bars, the cultivator-teeth, and ground-wheel being omitted; and Fig. 4 is a top plan view of the attachment.

Corresponding and like parts are referred to in the following description and indicated in all the views of the drawings by the same reference characters.

The beam comprises similar members 1, having an offset 2 near their front ends to bring the parts 3 close together, so as to receive the clevis-fastening, tooth, or other desired part. The beam is preferably constructed of a metal bar bent upon itself into the form substantially as shown, the end portions of the bar being welded or otherwise joined to form, in effect, an integral structure. A beam constructed in this manner is comparatively light and capable of resisting considerable wear and strain and may be easily handled.

The clevis 4 may be of any usual construction and is attached to the front end of the beam by means of a bolt or other fastening 5, the latter passing through rearwardly-extended lugs of the clevis and through the space formed at the front end of the beam at the fold of the bar. The handle-bars 6 are bolted or otherwise fastened at their lower ends to the side members of the beam and are supported by means of a brace-frame 7 of approximately triangular form, said frame being formed of a bar made fast to the handle-bars and having its end portions bent downwardly and inwardly and attached to the rear portion of the beam by means of a fastening 8.

The cultivator is in the nature of an attachment and may be removably and adjustably fitted to the beam, as shown most clearly in Fig. 1, and comprises a cross-piece 9 and side bars 10. The cross-piece 9 is formed of companion members vertically spaced so as to receive between them the contracted forward portion of the beam. These members are clamped to the beam by bolts or like fastenings 11, passed through registering openings formed therein. The bars 10 are pivotally connected at their front ends to the cross-piece 9 and are laterally adjustable at their rear ends. Connecting-bars 12 are pivoted to the rear ends of the bars 10 and overlap each other at their inner ends, which bars are secured to the rear portion of the beam by suitable fastening means. As shown, a link 13 embraces the overlapped ends of the connecting-bars 12, and a transverse key is passed through an end of the link and engages with the members 1 of the beam and secures the parts in an adjusted position. To prevent slipping of the key 14, the lower edge of the members 1 is notched, as shown at 15. The fastenings 11, connecting the parts of the cross-piece 9, are adapted to engage with the offset portions 2 of the beam members, so as to limit the rearward movement of the culitvator or harrow attachment when placed in position, and to prevent possible displacement should said fastening become loosened from any cause.

The attachment for depositing either seed or fertilizer comprises a frame 21, adapted to rest upon the beam, and provided with the hopper for containing the grain or fertilizer and with the operating mechanism for effecting a positive discharge thereof. A hopper 22 is provided at the rear end of the frame 21, and a ground-wheel 23 is arranged at the front end of said frame, suitable connections being interposed between the ground-wheel and the agitating means to insure positive supply of the grain or fertilizer in the operation of the mechanism. The base of the hopper is constructed to fit snugly between the companion bars 1 of the beam, whereas the frame 21 rests upon said bars or members. The reduced portion of the base is formed at its rear end with a hook 24 to make positive engagement with a transverse rod or bar 25, so as to hold the hopper in position and prevent vertical and rearward displacement thereof. The front end of the frame 21 is preferably free to have a limited vertical play, thereby adapting the ground-wheel 23 to follow irregularities in the surface of the soil. The weight of the attachment is sufficient in connection with the hook 24, transverse rod 25, and the reduced portion of the base of the hopper to retain the attachment in position under normal conditions. A shaft 28 is journaled transversely of the hopper 22 and is provided at one end with a crank-arm 29. An agitator 30 is fast to the shaft 28 and comprises a series of fingers. A tubular shaft 31 is mounted upon the shaft 28 and is provided at its outer end with a crank-arm 32 and is supplied with an agitator 33, corresponding in form with the agitator 30. A shaft 34 is located exterior to the hopper 22 and is mounted in extensions thereof and is provided at opposite ends with crank-arms 35 and 36. A pitman 37 connects the crank-arms 29 and 35, and a corresponding pitman 38 connects the crank-arms 32 and 36. The shaft 34 has pulley 39 fast thereto and connected by belt 40 with a corresponding pulley 41, fast with the axle of the ground-wheel 23. The crank-arms 36 and 35 project in opposite directions, and the connections between them and the shafts 28 and 31 are such as to move the agitators 30 and 33 in opposite directions. The bottom of the hopper has a discharge-opening 42, which is controlled by means of a slide 43 for regulating the discharge of the fertilizer or grain. The slide 43 is provided at opposite ends with inclined slots 44, which receive pins 45, connecting said slide with the bottom of the hopper and serving in conjunction with the slots 44 to direct said slide in its movements. A stem 46 is connected at its inner end with the slide 43 and passes through an opening in the rear wall of the hopper and is adapted to provide convenient means for manipulating the slide when it is required to vary the effective size of the discharge-opening, according to the quantity of fertilizer or grain to be deposited in a given space.

The covering-shovels 26 are attached to bars 27, which in turn are preferably pivotally connected at their front ends to the side members of the beam and which are laterally adjustable at their rear ends and adapted to be secured to the rear portion of the beam by suitable means.

The planter and fertilizer attachment when placed upon the beam has its frame 21 resting thereon and the pendent portion of the hopper snugly fitted between the members of said beam, the hook 24 receiving the rod 25 and forming positive connection between the attachment and beam, the front portion of the frame 21 being free to move vertically, whereby provision is had for adapting the ground-wheel 23 to follow irregularities in the surface of the ground. When the attachment is in position and the implement is advanced over the field, the ground-wheel 23 is rotated by traction and imparts movement to the shaft 34 by means of the belt 40 and pulleys 41 and 39. An oscillatory movement is imparted to the agitators 30 and 33 from the shaft 34 by means of the connections herein described, thereby insuring a positive feed of either the fertilizer or grain when the mechanism is in effective operation.

Having thus described the invention, what is claimed as new is—

1. In combination, a beam comprising transversely-spaced members, and a distributer attachment for either seed or fertilizer, the same comprising a frame, a hopper, a ground-wheel, agitating mechanism actuated by means of the ground-wheel, and connecting means between the attachment and beam at the hopper end of the frame leaving the end of the frame provided with the ground-wheel free to move vertically.

2. In combination, a beam comprising transversely-spaced members, a frame adapted to rest upon the beam, a hopper at one end of the frame provided with a pendent portion to snugly fit between the spaced members of the beam, a ground-wheel journaled to the opposite end of the frame and operating in the space formed between the members of said beam, agitating mechanism, and connecting means between the ground-wheel and agitating mechanism.

3. In combination, a hopper provided in its bottom with a discharge-opening, a slide for regulating the effective size of said opening and provided in opposite ends with inclined slots, pins passed through said inclined slots and serving to connect the slide to the bottom of the hopper and direct it in its movements, and a stem connected with said slide to facilitate adjustment thereof.

4. In a device of the character described, a beam comprising transversely-spaced members, a transverse rod 25 secured to said members, a frame adapted to rest upon the beam, and a hopper carried by said frame at the rear end thereof and provided with a hook adapted to engage said rod to form a connection between the rear end of the frame and the beam to admit of the front end of said frame having a limited vertical play.

5. In a device of the character described, a beam comprising transversely-spaced members, a transverse rod 25 connecting the members near the rear thereof, a frame adapted to rest upon the beam and having its rear portion extending between the members thereof to prevent relative lateral displacement of said frame, a wheel arranged in the front end of said frame, a hopper carried by the rear end of the frame, and a hook designed to engage said rod whereby to form connection between the rear end of the frame and the beam to admit of the front end of said frame having a limited vertical play.

In testimony whereof I affix my signature in presence of two witnesses.

DE WITT W. STRICKLAND. [L. S.]

Witnesses:
   M. M. HART,
   HOMER HART.